United States Patent
Akiyama

(10) Patent No.: US 8,682,353 B2
(45) Date of Patent: Mar. 25, 2014

(54) COMMUNICATION CONTROLLING METHOD, METHOD FOR SHARING INFORMATION, WIRELESS TERMINAL, WIRELESS BASE STATION, AND WIRELESS BASE STATION CONTROLLING APPARATUS

(75) Inventor: Masaki Akiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 847 days.

(21) Appl. No.: 12/343,604

(22) Filed: Dec. 24, 2008

(65) Prior Publication Data
US 2010/0003994 A1    Jan. 7, 2010

(30) Foreign Application Priority Data
Dec. 28, 2007   (JP) ................. 2007-341435

(51) Int. Cl.
H04W 24/00    (2009.01)

(52) U.S. Cl.
USPC ....... 455/456.4; 455/68; 455/550.1; 455/507; 455/561; 455/403; 455/444; 455/407; 455/425; 455/406; 455/558; 455/456.1; 455/414

(58) Field of Classification Search
USPC ............ 455/68, 550.1, 507, 561, 403, 408, 455/404.2, 511, 450, 456.1, 414.1, 444, 455/407, 425, 406, 434, 419, 558; 370/412, 370/254, 260, 230, 328, 338, 315, 238, 252, 370/335, 342, 229; 725/112
See application file for complete search history.

(56) References Cited

U.S. PATENT DOCUMENTS

| 6,400,948 | B1 * | 6/2002 | Hardin .................... 455/434 |
| 6,917,587 | B1 * | 7/2005 | Sarkar et al. ............. 370/230 |
| 7,058,031 | B2 | 6/2006 | Bender et al. |
| 7,126,924 | B2 | 10/2006 | Suzuki et al. |
| 7,308,245 | B2 | 12/2007 | Kakimoto et al. |
| 7,457,632 | B2 * | 11/2008 | Takagi et al. ........... 455/507 |
| 7,689,243 | B2 * | 3/2010 | Kaneda et al. .......... 455/550.1 |
| 8,213,394 | B2 * | 7/2012 | Coulas et al. ........... 370/338 |
| 2001/0000458 | A1 * | 4/2001 | Shtivelman et al. ...... 370/412 |
| 2003/0003960 | A1 | 1/2003 | Shoji et al. |
| 2006/0189308 | A1 * | 8/2006 | Kurata et al. .......... 455/422.1 |
| 2007/0061858 | A1 * | 3/2007 | Ura ....................... 725/112 |

(Continued)

FOREIGN PATENT DOCUMENTS

JP   A-1997-331288   12/1997
JP   2001-54164 A    2/2001

(Continued)

OTHER PUBLICATIONS

"Japanese Office Action" mailed by JPO and corresponding to Japanese application No. 2007-341435 on Apr. 24, 2012, with English translation.

(Continued)

Primary Examiner — Joseph Arevalo
(74) Attorney, Agent, or Firm — Fujitsu Patent Center

(57) ABSTRACT

The connection state of a wireless line, in which a communication can be immediately made in an estimated time period, is preset by estimating the time period with a high possibility of making a communication based on the communication history of a wireless terminal for a predetermined past period in a communication made between the wireless terminal and a wireless base station.

10 Claims, 15 Drawing Sheets

(56) References Cited

U.S. PATENT DOCUMENTS

| | | | |
|---|---|---|---|
| 2007/0165583 A1* | 7/2007 | Pecen | 370/338 |
| 2007/0184863 A1* | 8/2007 | Takagi et al. | 455/507 |
| 2008/0089290 A1* | 4/2008 | Coulas et al. | 370/331 |
| 2008/0092224 A1* | 4/2008 | Coulas et al. | 726/12 |
| 2008/0153475 A1* | 6/2008 | Lee et al. | 455/418 |
| 2008/0227402 A1* | 9/2008 | Kaneda et al. | 455/68 |
| 2008/0297371 A1* | 12/2008 | Ida | 340/825.52 |
| 2010/0172338 A1* | 7/2010 | Chou et al. | 370/345 |

FOREIGN PATENT DOCUMENTS

| | | | | |
|---|---|---|---|---|
| JP | 2003-37874 | | 2/2003 | |
| JP | A-2005-079660 | | 3/2005 | |
| JP | A-2005-117169 | | 4/2005 | |
| JP | 2005-257312 | | 9/2005 | |
| JP | 2006-245821 | * | 9/2006 | H04Q 7/38 |
| JP | 2007-251972 A | | 9/2007 | |
| JP | 2007-274372 A | | 10/2007 | |
| WO | WO-2007/097670 A1 | | 8/2007 | |

OTHER PUBLICATIONS

Japanese Office Action mailed Aug. 13, 2013 for corresponding Japanese Application No. 2012-141729, with Partial English-language Translation.

* cited by examiner

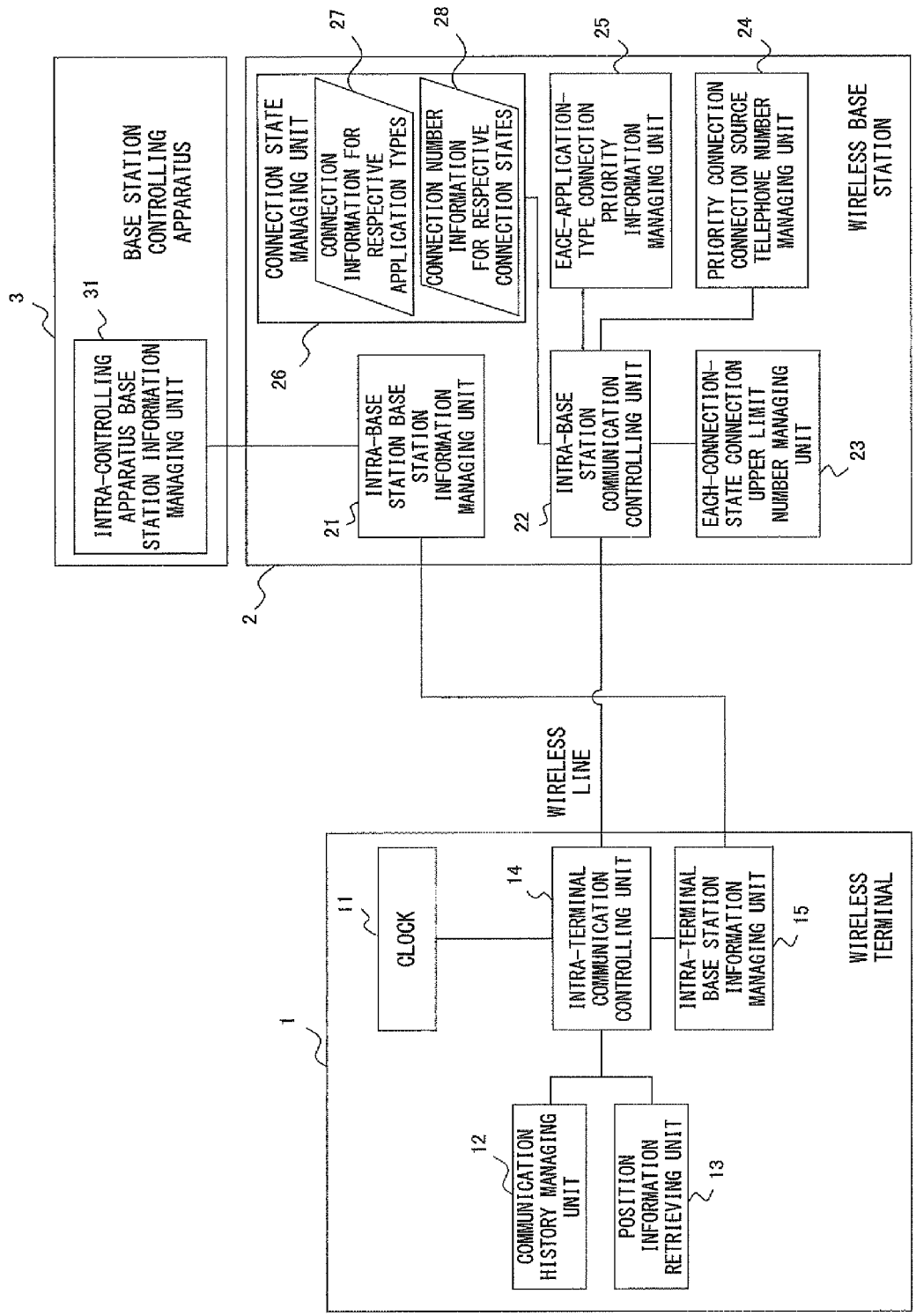
F I G. 2

| INCOMING/OUTGOING | COMUNICATION HISTORY INFORMATION ||||
| --- | --- | --- | --- | --- |
| | DAY OF THE WEEK | DATE | TIME | COMMUNICATION DURATION |
| INCOMING | MONDAY | FEBRURAY 3 | 10:00 | 30 MINUTES |
| INCOMING | TUESDAY | FEBRURAY 4 | 20:00 | 5 MINUTES |
| INCOMING | TUESDAY | FEBRURAY 4 | 23:00 | 5 MINUTES |
| INCOMING | THURSDAY | FEBRURAY 6 | 20:00 | 5 MINUTES |
| INCOMING | THURSDAY | FEBRURAY 6 | 23:00 | 5 MINUTES |
| INCOMING | FRIDAY | FEBRURAY 7 | 20:00 | 5 MINUTES |
| INCOMING | FRIDAY | FEBRURAY 7 | 23:00 | 5 MINUTES |
| INCOMING | MONDAY | FEBRURAY 10 | 10:00 | 30 MINUTES |
| INCOMING | TUESDAY | FEBRURAY 11 | 20:00 | 5 MINUTES |
| INCOMING | TUESDAY | FEBRURAY 11 | 23:00 | 5 MINUTES |
| INCOMING | THURSDAY | FEBRURAY 13 | 20:00 | 5 MINUTES |
| INCOMING | THURSDAY | FEBRURAY 13 | 23:00 | 5 MINUTES |
| INCOMING | FRIDAY | FEBRURAY 14 | 20:00 | 5 MINUTES |
| INCOMING | FRIDAY | FEBRURAY 14 | 23:00 | 5 MINUTES |
| INCOMING | MONDAY | FEBRURAY 17 | 10:00 | 30 MINUTES |
| INCOMING | MONDAY | FEBRURAY 17 | 13:00 | 5 MINUTES |
| INCOMING | TUESDAY | FEBRURAY 18 | 20:00 | 5 MINUTES |
| INCOMING | TUESDAY | FEBRURAY 18 | 23:00 | 5 MINUTES |
| INCOMING | THURSDAY | FEBRURAY 20 | 20:00 | 5 MINUTES |
| INCOMING | THURSDAY | FEBRURAY 20 | 23:00 | 5 MINUTES |
| INCOMING | FRIDAY | FEBRURAY 21 | 20:00 | 5 MINUTES |
| INCOMING | FRIDAY | FEBRURAY 21 | 23:00 | 5 MINUTES |
| INCOMING | MONDAY | FEBRURAY 24 | 10:00 | 30 MINUTES |
| INCOMING | TUESDAY | FEBRURAY 25 | 20:00 | 5 MINUTES |
| INCOMING | TUESDAY | FEBRURAY 25 | 23:00 | 5 MINUTES |
| INCOMING | THURSDAY | FEBRURAY 27 | 20:00 | 5 MINUTES |
| INCOMING | THURSDAY | FEBRURAY 27 | 23:00 | 5 MINUTES |
| INCOMING | FRIDAY | FEBRURAY 28 | 20:00 | 5 MINUTES |
| INCOMING | FRIDAY | FEBRURAY 28 | 23:00 | 5 MINUTES |

F I G. 3

| BASE STATION NAME | POSITION | | PROHIBITION TIME FOR EACH CONNECTION TYPE | |
|---|---|---|---|---|
| | LATITUDE | LONGITUDE | ACTIVE | DORMANT |
| KAWASAKI | 180 | 100 | 22:00~0:00 | 0:00~1:00 |
| YOKOHAMA | 170 | 90 | 20:00~2:00 | 23:00~0:00 |
| SHINBASHI | 130 | 70 | 8:00~12:00 | 9:00~10:00 |

FIG. 4

| CONNECTION STATE | CONNECTION UPPER LIMIT |
|---|---|
| ACTIVE | 10 |
| DORMANT | 30 |

FIG. 5

| PRIORITY CONNECTION CONNECTION SOURCE TELEPHONE NUMBER |
|---|
| 080- 1111- 0000 |
| 080- 1111- 0003 |
| 080- 1111- 0017 |
| 080- 1111- 0023 |

F I G. 6

| APPLICATION TYPE | PRIORITY |
|---|---|
| MAIL | HIGH |
| NAVIGATION | LOW |
| GAME | LOW |
| TELEPHONE | HIGH |
| GROUP CALL | MEDIUM |

FIG. 7

CONNECTIO INFORMATION FOR RESPECTIVE APPLICATION TYPES

| APPLICATION TYPE | CONNECTION SOURCE | CONNECTION STATE | COMMUNICATION STATE |
|---|---|---|---|
| NAVIGATION | 080- 1111- 0000 | DORMANT | COMMUNICATION NOT BEING MADE |
| TELEPHONE | 080- 1111- 0001 | ACTIVE | COMMUNICATION BEING MADE |
| MAIL | 080- 1111- 0002 | DORMANT | COMMUNICATION NOT BEING MADE |
| NAVIGATION | 080- 1111- 0003 | ACTIVE | COMMUNICATION BEING MADE |
| NAVIGATION | 080- 1111- 0004 | ACTIVE | COMMUNICATION NOT BEING MADE |
| MAIL | 080- 1111- 0005 | DORMANT | COMMUNICATION NOT BEING MADE |
| GROUP CALL | 080- 1111- 0006 | ACTIVE | COMMUNICATION BEING MADE |
| GROUP CALL | 080- 1111- 0007 | ACTIVE | COMMUNICATION NOT BEING MADE |
| MAIL | 080- 1111- 0008 | DORMANT | COMMUNICATION NOT BEING MADE |
| TELEPHONE | 080- 1111- 0009 | ACTIVE | COMMUNICATION BEING MADE |
| TELEPHONE | 080- 1111- 0010 | ACTIVE | COMMUNICATION BEING MADE |
| NAVIGATION | 080- 1111- 0011 | DORMANT | COMMUNICATION NOT BEING MADE |
| NAVIGATION | 080- 1111- 0012 | DORMANT | COMMUNICATION NOT BEING MADE |
| MAIL | 080- 1111- 0013 | DORMANT | COMMUNICATION NOT BEING MADE |
| MAIL | 080- 1111- 0014 | DORMANT | COMMUNICATION NOT BEING MADE |
| NAVIGATION | 080- 1111- 0015 | DORMANT | COMMUNICATION NOT BEING MADE |
| NAVIGATION | 080- 1111- 0016 | DORMANT | COMMUNICATION NOT BEING MADE |
| GAME | 080- 1111- 0017 | ACTIVE | COMMUNICATION NOT BEING MADE |
| GAME | 080- 1111- 0018 | ACTIVE | COMMUNICATION BEING MADE |
| NAVIGATION | 080- 1111- 0019 | ACTIVE | COMMUNICATION BEING MADE |
| GROUP CALL | 080- 1111- 0020 | DORMANT | COMMUNICATION NOT BEING MADE |
| GROUP CALL | 080- 1111- 0021 | DORMANT | COMMUNICATION NOT BEING MADE |
| GAME | 080- 1111- 0022 | DORMANT | COMMUNICATION NOT BEING MADE |
| GAME | 080- 1111- 0023 | DORMANT | COMMUNICATION NOT BEING MADE |

F I G. 8

CONNECTION NUMBER INFORMATION FOR RESPECTIVE CONNECTION STATES

| CONNECTION STATE | TELEPHONE | MAIL | NAVIGATION | GROUP CALL | GAME | TOTAL |
|---|---|---|---|---|---|---|
| DORMANT |  | 5 | 5 | 2 | 2 | 14 |
| ACTIVE | 3 |  | 3 | 2 | 2 | 10 |

F I G. 9

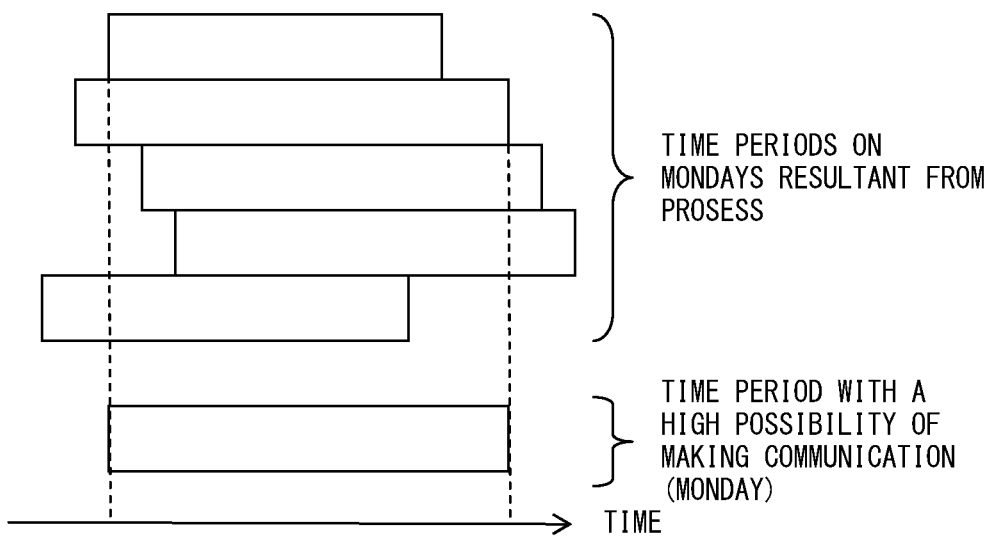
F I G. 1 1

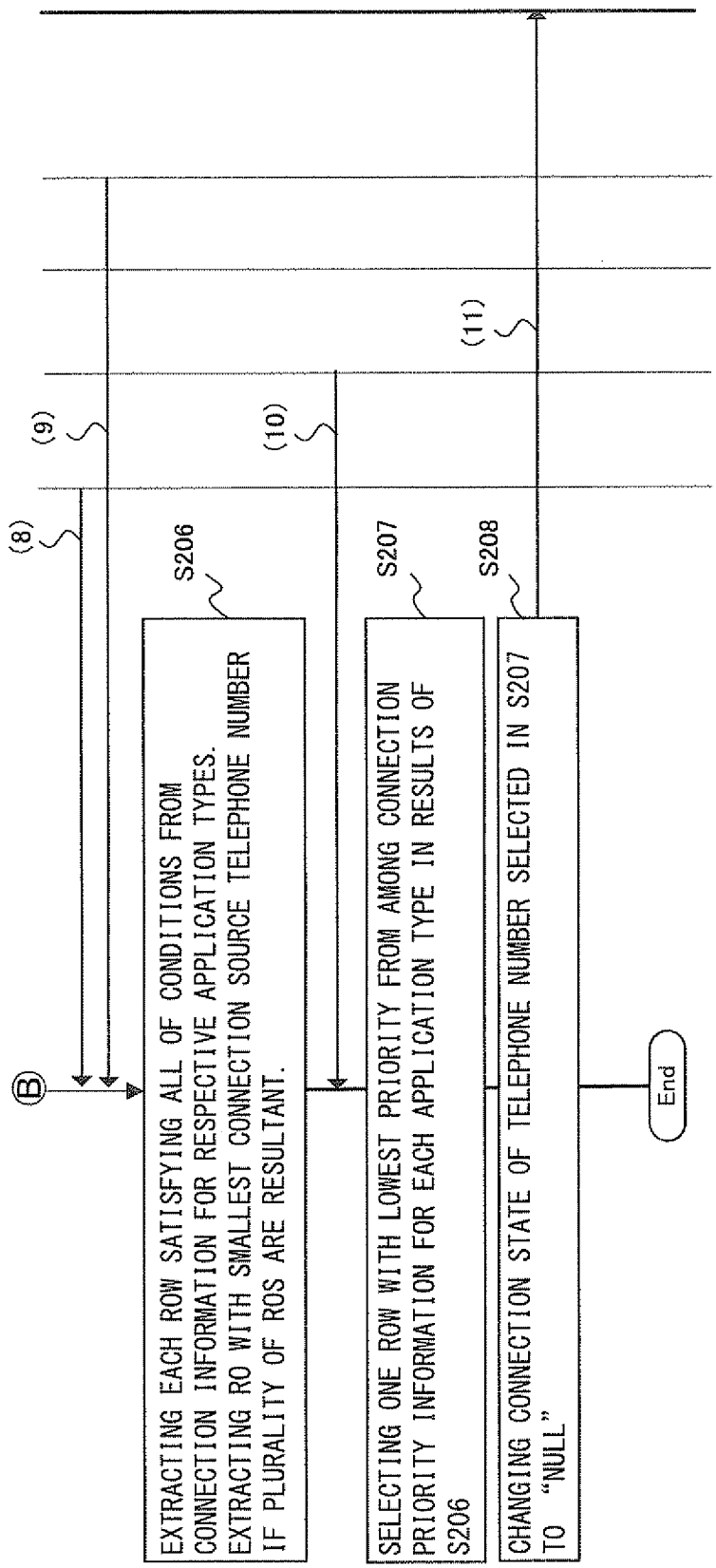

COMMUNICATION CONTROLLING METHOD, METHOD FOR SHARING INFORMATION, WIRELESS TERMINAL, WIRELESS BASE STATION, AND WIRELESS BASE STATION CONTROLLING APPARATUS

BACKGROUND OF THE INVENTION

1. Field of the Invention

The present invention relates to a technique by which a wireless terminal and a wireless base station make a communication by using a wireless line.

2. Description of the Related Art

When a wireless terminal and a wireless base station make a communication by using a wireless line, the connection state of the wireless line is changed among three connection states such as active, dormant, and null states.

Here, the active state indicates a state in which the wireless base station and the wireless terminal make a communication by using a wireless line after the wireless base station authenticates the wireless terminal, or a state in which the wireless line is occupied and a communication can be immediately made although a communication is not made (namely, the state in which the wireless base station allocates the communication channel to the wireless terminal and a communication can be made).

The dormant state indicates a state in which the wireless line is released although the wireless base station and the wireless terminal maintain a communication state after the wireless base station authenticates the wireless terminal (namely, the state in which the communication channel is released and the logical connection of a network between the wireless base station and the wireless terminal is maintained).

The null state indicates a state in which the wireless line is released until the wireless base station calls the wireless terminal after the wireless terminal registers its position information to the wireless base station (namely, the state in which the communication channel is released and the logical connection of the network between the wireless base station and the wireless terminal is disconnected).

As is evident from the above definitions, a transition from the null state can be made only to the active state, a transition from the active state can be made to the dormant or the null state, and a transition from the dormant state can be made to the active or the null state.

Techniques for changing a connection state to a suitable state depending on a case are known.

For example, Japanese Patent Publication No. 2003-37874 discloses the technique for improving the use efficiency of a line by variably setting the threshold value of an inactivity timer for measuring a time from the completion of transmission/reception of a packet, namely, the value for changing a connection from an active state to a dormant state after the active state continues for the corresponding time depending on the type of data (electronic mail, stream data of a moving picture, etc.) to be transmitted/received.

Additionally, Japanese Patent Publication No. 2005-257312 discloses the technique for causing a navigation terminal device to be already changed to an active state at the time of actual transmission/reception of information, for example, by transmitting/receiving dummy information when an event (the start of destination setting, etc.) that is proved to transmit/receive the information soon is issued in a dormant state or a null state in the navigation terminal device. With the technique disclosed by this document, responsiveness to the transmission/reception of information can be improved.

SUMMARY OF THE INVENTION

An object of the present invention is to provide a technique that can reduce the amount of time required for an outgoing/incoming call between a wireless terminal and a wireless base station.

A communication controlling method to which the present invention is applied assumes that a wireless terminal and a wireless base station make a communication by using a wireless line. With this method, a time period with a high possibility of making a communication is estimated based on the communication history of the wireless terminal for a predetermined past period, and the connection state of the wireless line is changed beforehand to a state, in which a communication can be immediately made, in a time period with a high possibility of making a communication. As a result, the amount of time required for an outgoing/incoming call, mail, etc. in the time period can be reduced.

The connection state is classified as an active state in which the wireless line is occupied and a communication can be immediately made, a dormant state in which the wireless line is released and a logical connection with the wireless base station is maintained, and a null state in which the wireless line is released and the logical connection with the wireless base station is disconnected.

According to this classification, for example, the connection state of the wireless line is changed beforehand (preset) to the active state, in which a communication can be immediately made, in a time period with a high possibility of making a communication.

Alternatively, the use frequency of a wireless line in a wireless base station to which a wireless terminal is connected may be reflected on a change in a connection state when the connection state of a wireless line must be changed beforehand if the limited wireless lines are considered (attempts are made to achieve a balance between the advantage that an incoming/outgoing call, mail, etc. can be quickly made, and the effective use of a wireless line).

For example, a wireless base station notifies a wireless terminal connected thereto of a time that prohibits the active state, and a time that prohibits the dormant state, the wireless terminal changes its connection state to the active state if the current time is not included in the active prohibition time, changes its connection state to the dormant state if the current time is included in the active connection prohibition time and not included in the dormant connection prohibition time, and changes its connection state to the null state if the current time is included both in the active connection prohibition time and in the dormant connection prohibition time.

By applying the present invention, the amount of time required for an incoming/outgoing call, mail, etc. between a wireless terminal and a wireless base station can be reduced with a high probability. Additionally, the possibility that an incoming/outgoing call, mail, etc. can be quickly made can be increased while preventing the use efficiency of a wireless line from decreasing.

BRIEF DESCRIPTION OF THE DRAWINGS

FIG. 2 is a block diagram showing further details of the communication system shown in FIG. 1;

FIG. 3 is a diagram showing one example of a communication history information table;

FIG. 4 is a diagram showing one example of a base station information table;

FIG. 5 is a diagram showing one example of a connection upper limit number table;

FIG. 6 is a diagram showing one example of a priority connection connection source telephone number table;

FIG. 7 is a diagram showing one example of a connection priority table for respective application types;

FIG. 8 is a diagram showing one example of a connection information table for respective application types;

FIG. 9 is a diagram showing one example of a connection number information table for respective connection states;

FIG. 11 is a schematic diagram showing a method for calculating a time period with a high possibility of making a communication;

DESCRIPTION OF THE PREFERRED EMBODIMENTS

An embodiment according to the present invention is described in detail below with reference to the drawings.

Figure 1:
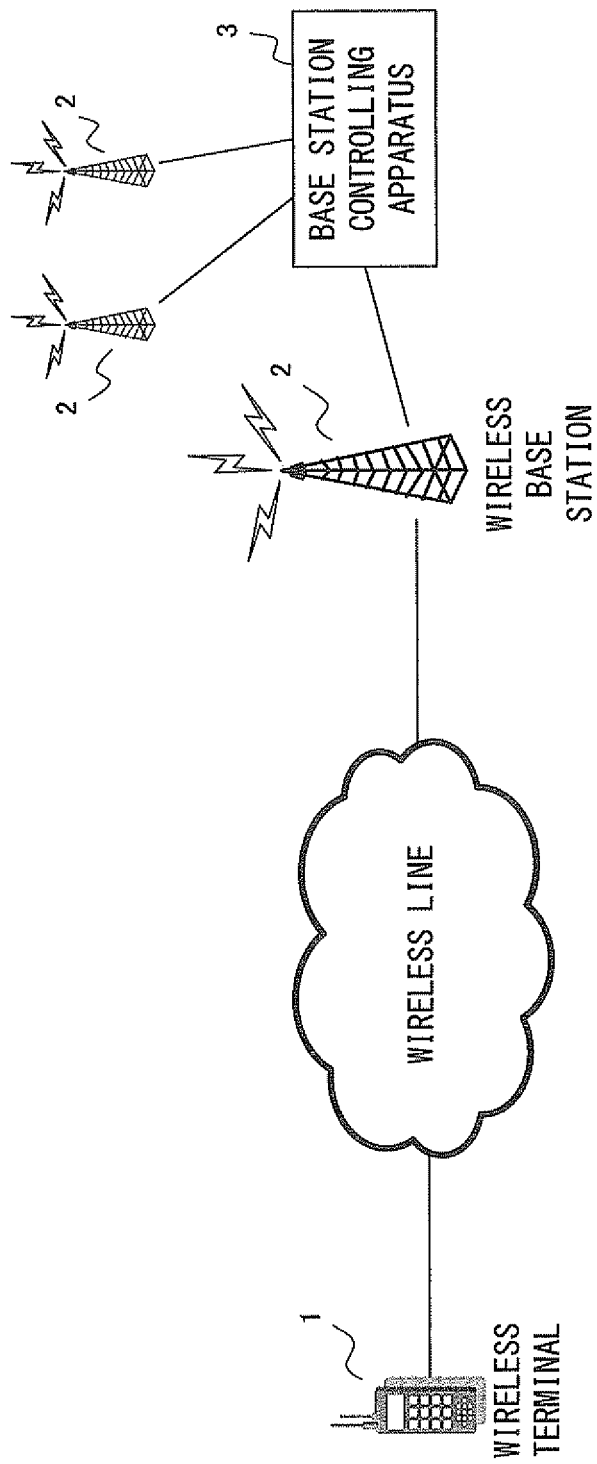
FIG. 1 is a schematic diagram showing an overview of a communication system according to an embodiment of the present invention.

FIG. 1 is a schematic diagram showing an overview of a communication system according to the embodiment of the present invention.

As shown in this figure, a wireless terminal 1 and a wireless base station 2 make a communication by using a wireless line in the communication system.

The wireless base station 2 calculates its time period with a heavy communication traffic volume by using a predetermined method, and holds connection prohibition times (for example, data in one row in a table shown in FIG. 4) for respective connection types (active and dormant) as results of the calculation.

It is desirable for the wireless terminal 1 to reference a listing of base stations close to the current position when the wireless terminal 1 itself attempts to identify the wireless base station, to which the wireless terminal 1 itself is currently being connected, by using the function of GPS (Global Positioning System) with firmware. However, the listing of base stations is to be held by a wireless base station controlling apparatus (hereinafter referred to as a "base station controlling apparatus") 3.

Accordingly, connection prohibition times for the active and the dormant states of the wireless base station 2, which are calculated by the wireless base station 2 itself, are notified to the base station controlling apparatus 3 in this embodiment. The base station controlling apparatus 3 creates the base station information table shown in FIG. 4 by summarizing connection prohibition times for the active and the dormant states, which are notified from wireless base stations 2 that the base station controlling apparatus 3 itself manages.

Then, the wireless base station 2 obtains this table from the base station controlling apparatus 3, for example, at predetermined time intervals. Additionally, the wireless terminal 1 obtains this table from the wireless base station 2, for example, at predetermined time intervals. As a result, the table shown in FIG. 4 is shared by the base station controlling apparatus 3, the wireless base station 2, and the wireless terminal 1, whereby the above described process using firmware can be executed.

FIG. 2 is a block diagram showing further details of the communication system shown in FIG. 1.

As shown in this figure, the wireless terminal 1 includes an intra-terminal communication controlling unit 14, a communication history managing unit 12, an intra-terminal base station information managing unit 15, a position information retrieving unit 13, and a clock 11. The wireless base station 2 includes an intra-base station communication controlling unit 22, an each-connection-state connection upper limit number managing unit 23, a priority connection source telephone number managing unit 24, an each-application-type connection priority information managing unit 25, a connection state managing unit 26, and an intra-base station base station information managing unit 21. The base station controlling apparatus 3 includes an intra-controlling apparatus base station information managing unit 31.

A time period during which a user makes a communication by using the wireless terminal 1 is, for example, almost the same time period on each day of the week, or almost the same time period every weekday (Monday to Friday). A time period during which a user makes a communication by using the wireless terminal 1 has some tendency in many cases as described above.

The intra-terminal communication controlling unit 14 of the wireless terminal 1 beforehand calculates such a time period during which a user makes a communication with a relatively high possibility (a time period with a relatively high possibility of making a communication), and controls the connection state so that the wireless terminal 1 can immediately make a communication with the wireless base station 2 in this time period.

As will be described later, the intra-terminal communication controlling unit 14 sometimes obtains required information from the wireless base station 2 at the time of switching the connection state. Operations of the intra-terminal communication controlling unit 14 will be described later with reference to the flowchart shown in FIG. 10.

When the wireless terminal 1 makes a communication, the communication history managing unit 12 adds the following items on the communication to communication history information.

incoming or outgoing
  a day of the week
  date
  (communication start) time
  communication duration An example of a communication history data table managed by the communication history managing unit 12 is shown in FIG. 3.

The intra-terminal base station information managing unit 15 obtains information (the base station information table shown in FIG. 4) about a wireless base station 2 and other wireless base stations 2 close to the wireless base station 2 from the wireless base station 2 to which the wireless terminal 1 is connected, and manages the information. The intra-terminal base station information managing unit 15 manages a time period (namely, a time period during which the communication traffic volume of the wireless base station 2 is apt to increase) that does not allow the state (the active state or the dormant state) in which a communication can be immediately made although the wireless terminal 1 does not make a communication with the wireless base station 2 on the other end.

The information managed by the intra-terminal base station information managing unit 15 includes the following items.

the name of a base station
the position (latitude and longitude) of the base station
active connection prohibition time
dormant connection prohibition time Here, the "active connection prohibition time" is a time period that prohibits the active state in which a communication is not made, whereas the "dormant connection prohibition time" is a time period that prohibits the dormant state in which a communication is not made.

The intra-terminal base station information managing unit 15 obtains the above described items of information from the wireless base station 2 at predetermined time intervals, and notifies the intra-terminal communication controlling unit 14 of the information, which the intra-terminal base station information managing unit 15 itself holds, in response to a request issued from the intra-terminal communication controlling unit 14.

The position information retrieving unit 13 retrieves the current position of the wireless terminal 1. Generally, this retrieval is made with GPS.

The position information retrieving unit 13 manages the following item of information, and notifies the intra-terminal communication controlling unit 14 of the information, which the position information retrieving unit 13 itself of the local wireless terminal 1 holds, in response to a request issued from the intra-terminal communication controlling unit 14.

the position (latitude and longitude) of a wireless terminal

The clock 11 notifies the intra-terminal communication controlling unit 14 of the following items of information in response to a request issued from the intra-terminal communication controlling unit 14.

a day of the week
date
time

The intra-base station communication controlling unit 22 of the wireless base station 2 performs a priority control for connections on the basis of a predetermined method when wireless lines become saturated. Operations of the intra-base station communication controlling unit 22 will be described later with reference to the flowchart shown in FIG. 12.

The each-connection-state connection upper limit number managing unit 23 manages the upper limit number of connections respectively for connection states, which indicates the saturation of wireless lines in the wireless base station 2. The each-connection-state connection upper limit managing unit 23 notifies the intra-base station communication controlling unit 22 of the information, which the each-connection-state connection upper limit number managing unit 23 itself of the local wireless base station 2 manages, in response to a request issued from the intra-base station communication controlling unit 22.

An example of a connection upper limit number table managed by the each-connection-state connection upper limit number managing unit 23 is shown in FIG. 5.

The priority connection source telephone number managing unit 24 manages telephone numbers that can be connected with high priority even when wireless lines are saturated. The priority connection connection source telephone number managing unit 24 notifies the intra-base station communication controlling unit 22 of the information, which the priority connection source telephone number managing unit 24 manages, in response to a request issued from the intra-base station communication controlling unit 22.

An example of a priority connection source telephone number table managed by the priority connection source telephone number managing unit 24 is shown in FIG. 6.

The each-application-type connection priority information managing unit 25 manages the priorities of connections respectively for applications. The each-application-type connection priority information managing unit 25 notifies the intra-base station communication controlling unit 22 of the information, which the each-application-type connection priority information managing unit 25 itself manages, in response to a request issued from the intra-base station communication controlling unit 22.

An example of a connection priority table for respective application types, which is managed by the each-application-type connection priority information managing unit 25, is shown in FIG. 7.

The connection state managing unit 26 manages the state of a wireless terminal currently being connected to the wireless base station 2.

Specifically, the connection state managing unit 26 manages (1) connection information for respective application types, and (2) connection number information for respective connection states.

The connection information for respective application types includes the following items.
application type
connection source telephone number
connection state (active or dormant)
communication state An example of a connection information table for respective application types, which is managed by the connection state managing unit 26, is shown in FIG. 8.

The connection number information for respective connection states includes the following items.
connection state (active or dormant)
the number of connections for each application type, and for each connection state
(the total sum of) the numbers of connections for each connection state An example of a connection number information table for respective connection states, which is managed by the connection state managing unit 26, is shown in FIG. 9.

The connection state managing unit 26 notifies the intra-base station communication controlling unit 22 of the information, which the connection state managing unit 26 itself manages, in response to a request issued from the intra-base station communication controlling unit 22.

The intra-base station base station information managing unit 21 manages information (the base station information table shown in FIG. 4) about the local wireless base station 2, and other wireless base stations managed by the base station controlling apparatus 3, which the local base station 2 obtains from the base station controlling apparatus 3. The intra-base station base station information managing unit 21 manages a time period (the time period during which the communication traffic volume of the wireless base station is expected to be relatively high) that does not allow the state (the active state or the dormant state) in which a communication can be immediately made although the wireless terminal 1 does not make a communication with the local wireless base station 2 on the other end.

The information managed by the intra-base station base station information managing unit 21 includes the following items.
the name of a base station
the position (latitude and longitude) of the base station
active connection prohibition time
dormant connection prohibition time The "active connection prohibition time" is a time period that prohibits an active state in which a communication is not made. In contrast, the "dormant connection prohibition time" is a time period that prohibits a dormant state in which a communication is not made.

The intra-base station base station information managing unit 21 obtains the above described items of information from the base station controlling apparatus 3 at predetermined time intervals, and notifies the intra-base station communication controlling unit 22 of the information, which the intra-base station base station information managing unit 21 itself holds, in response to a request issued from the intra-base station communication controlling unit 22.

The intra-controlling apparatus base station information managing unit 31 of the base station controlling apparatus 3 manages the base station information table that is shown in FIG. 4 and created by summarizing active connection prohibition times and dormant connection prohibition times, which are notified from a plurality of wireless base stations managed by the local base station controlling apparatus 3. The intra-controlling apparatus base station information managing unit 31 manages, for each of the wireless base stations 2, the time period (namely, the time period during which the communication traffic volume of the corresponding wireless base station is expected to be relatively high) that does not allow the state (the active state or the dormant state) in which a communication can be immediately made although the wireless terminal 1 does not make a communication with the wireless base station 2 on the end.

The information managed by the intra-controlling apparatus base station information managing unit 31 includes the following items.
    the name of a base station
    the position (latitude and longitude) of the base station
    active connection prohibition time
    dormant connection prohibition time The "active connection prohibition time" is a time period that prohibits an active state without making a communication. The "dormant connection prohibition time" is a time period that prohibits a dormant state without making a communication.

The intra-controlling apparatus base station information managing unit 31 calculates the above described items of information at predetermined time intervals, and notifies the intra-base station base station information managing unit 21 of the information, which the intra-controlling apparatus base station information managing unit 31 itself holds, in response to a request issued from the intra-base station base station information managing unit 21.

Figure 10A:
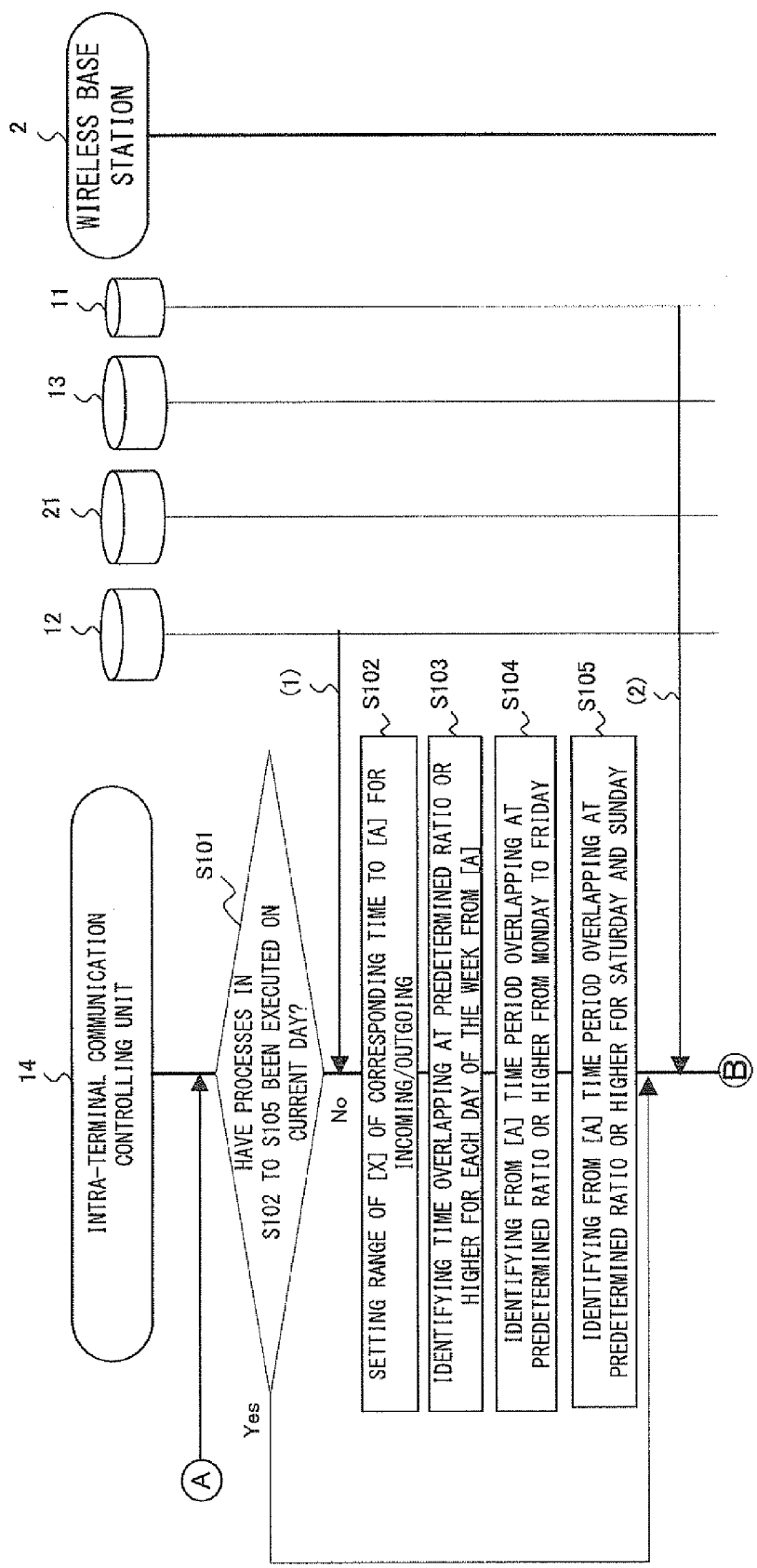
FIG. 10 is a flowchart showing a communication control process executed by a wireless terminal.
Figure 10B:
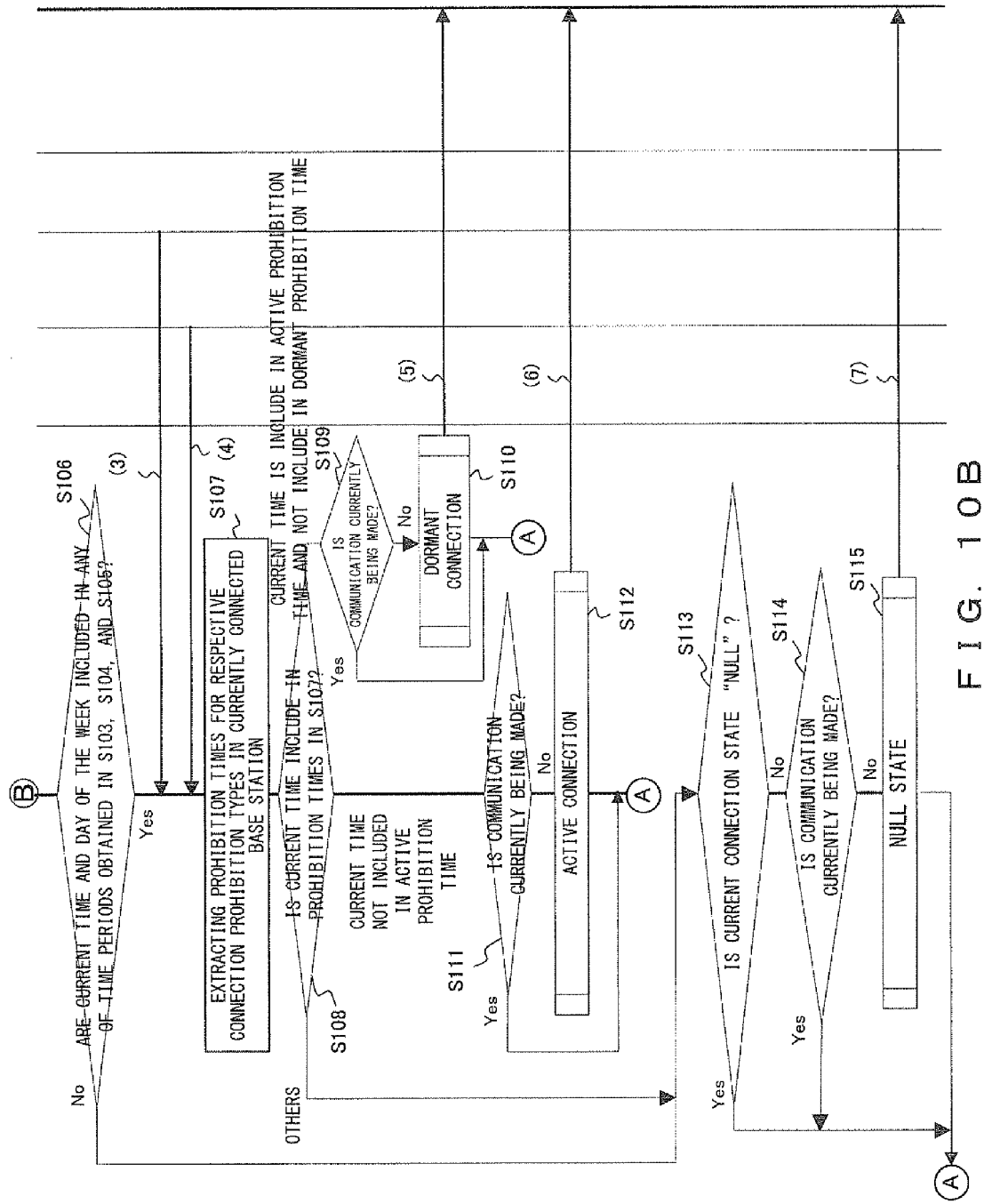

FIG. 10 is a flowchart showing a communication control process executed by the wireless terminal 1.

The process represented by this flowchart is executed by the intra-terminal communication controlling unit 14 shown in FIG. 2. Additionally, this process is triggered by the power-up of the wireless terminal 1.

In step S101 of FIG. 10, whether or not processes in steps S102 to 105 have been executed on the current day is determined.

If the processes in steps S102 to S105 are determined to have been already executed on the current day in step S101, the flow goes to step S106 after the current day of the week and time are obtained with the clock 11 in (2).

If the processes in steps S102 to S105 are determined not to have been executed yet on the current day in step S101, the communication history information table of the most recent predetermined period (assuming that the predetermined period is one month, and the current date is March 1, for example, the data shown in FIG. 3 is obtained as the data of the most recent predetermined period) with the communication history managing unit 12 in (1). Then, the flow goes to step S102.

In step S102, a communication start time and a communication end time are obtained by referencing values set in "time" and "communication duration" in each row of the obtained communication history information table, and the obtained communication start time and communication end time are respectively made earlier and later by a small amount. Namely, some time margin is given to the obtained communication start time and communication end time. For example, in the first row of the table shown in FIG. 3, "communication start time=10:00, communication end time=10: 30" is obtained. By giving, for example, a time margin of 10 minutes to the obtained times, "communication start time to which the time margin is given=9:50, communication end time to which the time margin is given=10:40", namely, a "communication time period to which the time margins is given=9:50 to 10:40" is obtained.

As described above, "time periods with a high possibility of making a communication" are obtained in the subsequent steps S103, S104, and S105 by using values to which the time margin is given. Then, a connection state is changed based on the results of the determination of whether or not the current time is included in the "time period with a high possibility of making a communication", whereby the possibility that the connection state is already changed to the state, in which the communication can be immediately made (the active state or the dormant state), when an actual communication is made can be increased.

Then, in step S103, communication start and end times to which the time margin is given (communication time periods to which the time margin is given) and which are calculated in step S102 in the respective rows of the communication history information table obtained in (1) are classified by each day of the week. Then, a "time period with a high possibility of making a communication" for each day of the week is obtained by logical-ORing the communication time periods, to which the time margin is given, for each day of the week. At this time, a time period portion, which overlaps at a predetermined ratio or higher, of the communication time periods to which the time margin is given is utilized as the result of the logical OR operation. FIG. 11 assumes that communication time periods, to which the time margin is given, on five Mondays within the most recent one month are used, and the predetermined ratio is set to 50 percent. Since the number of communication time periods used is 5, its 50 percent is 2.5. Therefore, overlapping time period portions the number of which is 2 or smaller are not utilized as the result of the logical OR operation.

In step S104, a "time period with a high possibility of making a communication as a pattern common to weekdays" is obtained by extracting a communication start time and a communication end time on weekdays (Monday to Friday) from among the communication start and end times to which the time margin is given (the communication time periods to which the time margin is given), and which are calculated in step S102 in the respective rows of the communication history information table obtained in (1), and by logical-ORing the extracted communication time periods with a method similar to that shown in FIG. 11.

In step S105, a "time period with a high possibility of making a communication as a pattern common to weekends" is obtained by extracting a communication start time and a communication end time on weekends (Saturday and Sunday) from among the communication start and end times to which the time margin is given (the communication time periods to which the time margin is given), and which are calculated in step S102 in the respective rows of the communication history information table obtained in (1), and by logical-ORing the extracted time periods with a method similar to that shown in FIG. 11.

Then, the flow goes to step S106 after the current day of the week and time are obtained with the clock 11 in (2).

In step S106, whether or not the current day of the week and time, which are obtained from the clock 11, are included in any of the time periods with a high possibility of making a communication, which are obtained in steps S103, S104, and S105, is determined.

If the current day of the week and time are determined to be included in none of the time periods with a high possibility of making a communication in step S106, whether or not the current connection state is the null state is determined in step S113.

If the current connection state is the null state in step S113, the flow goes back to step S101.

If the current connection state is determined not to be the null state in step S113, whether or not a communication is being made is determined in step S114.

If the communication is determined to be currently being made in step S114, the flow goes back to step S101.

If the communication is determined not to be currently being made in step S114, the connection state is changed by notifying the wireless base station 2 that the connection state is to be changed to the null state in step S115 (in (7)). Then, the flow goes back to step S101.

If the current day of the week and time are determined to be included in any of the time periods with a high possibility of making a communication in step S106, the current position (latitude and longitude) of the local wireless terminal 1 is obtained with the position information retrieving unit 13 in (3), and the base station information table shown in FIG. 4 is obtained with the intra-terminal base station information managing unit 15. Then, the flow goes to step S107.

In step S107, a base station which is included in the base station information table obtained in (4) and the position (latitude and longitude) of which is closest to the position (latitude and longitude) of the local wireless terminal 1, which is obtained in (3), is identified as the base station to which the local wireless terminal 1 is currently being connected, and prohibition times (an active connection prohibition time and a dormant connection prohibition time) for the respective connection types of the identified base station are extracted from the base station information table obtained in (4).

Then, in step S108, whether or not the current time is included in the prohibition times extracted in step S107 is determined.

If the current time is determined not to be included in the active connection prohibition time in step S108, whether or not a communication is currently being made is determined in step S111.

If the communication is determined to be currently being made in step S111, the flow goes back to step S101. If the communication is determined not to be currently being made in step S111, the connection state is changed by notifying the wireless base station 2 that the connection state is to be changed to the active state (in (6)) in step S112. Then, the flow goes back to step S101.

If the current time is determined to be included in the active connection prohibition time and not to be included in the dormant connection prohibition time in step S108, whether or not a communication is currently being made is determined in step S109.

If the communication is determined to be currently being made in step S109, the flow goes back to step S101. If the communication is determined not to be currently being made in step S109, the connection state is changed by notifying the wireless base station 2 that the connection state is to be changed to the dormant state (in (5)) in step S110. Then, the flow goes back to step S101.

In the above description, the connection state is controlled in consideration of the use state of a wireless line in the base station 2 to which the wireless terminal 1 is currently being connected in the processes in and after step S106. However, the processes in and after step S106 may be simplified as follows.

Namely, a process executed when the current day of the week and time are determined to be included in none of the time periods with a high possibility of making a communication in step S106 is executed similarly. If the current day of the week and time are determined to be included in any of the time periods with a high possibility of making a communication in step S106, whether or not a communication is currently being made is further determined. If the communication is determined to be currently being made, the flow goes back to step S101. Alternatively, if the communication is determined not to be currently being made, the connection state is changed by notifying the wireless base station 2 that the connection state is to be changed to the active state. Then, the flow goes back to step S101.

For reference, time periods output in steps S103, S104, and S105 of FIG. 10 when the data shown in FIG. 3 is processed under the following preconditions are listed below.

Figure 12A:
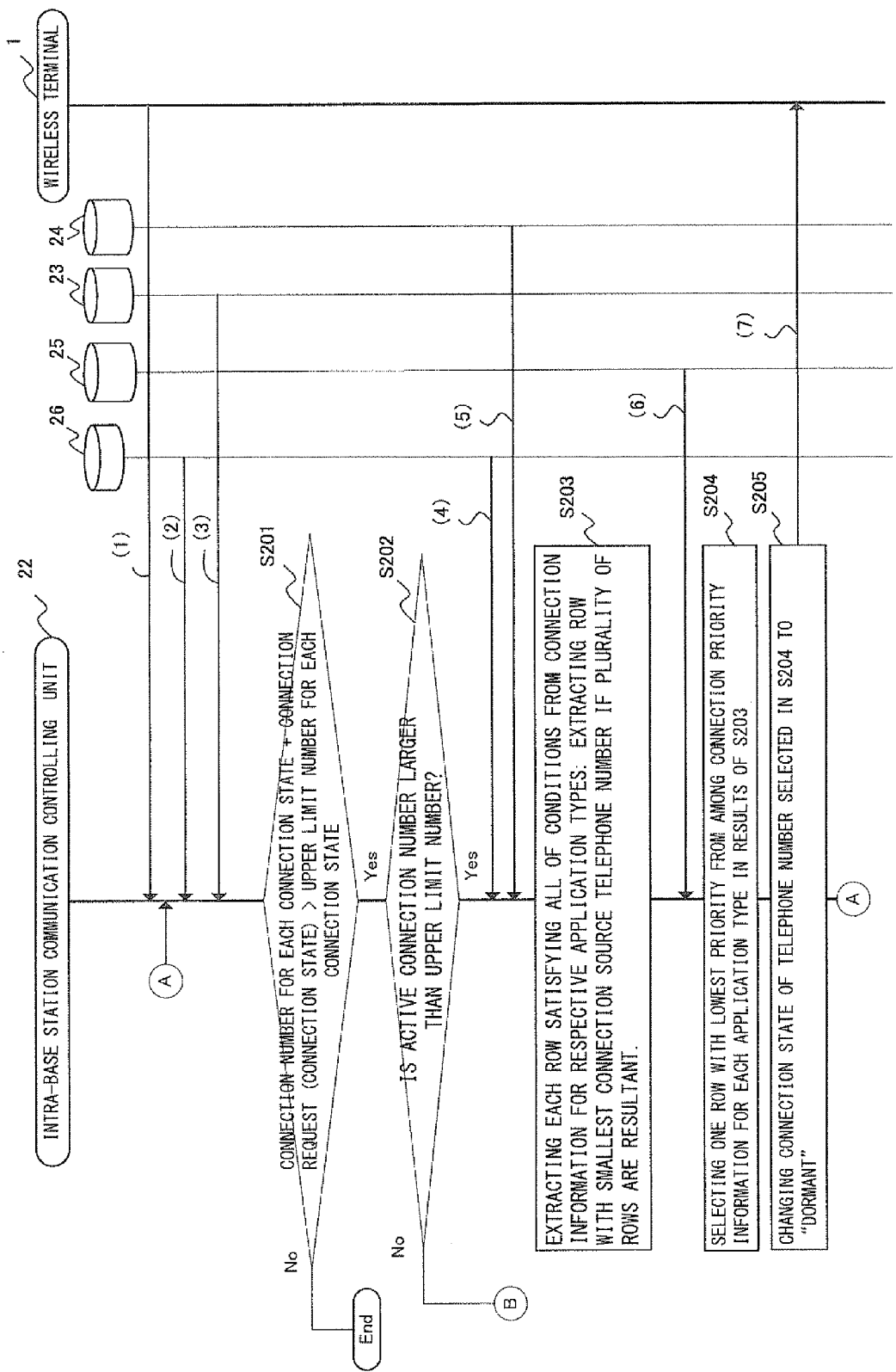
FIG. 12 is a flowchart showing a communication control process executed by a wireless base station.

(Preconditions)
    a process start time is March 1
    communication start time and communication end time are respectively made earlier and later by 10 minutes in order to give a time margin
    the predetermined ratio is set to 50 percent
(Outputs in Step S103)
    Monday: 9:50 to 10:40
    Tuesday: 19:50 to 20:15, 22:50 to 23:15
    Thursday: 19:50 to 20:15, 22:50 to 23:15
    Friday: 19:50 to 20:15, 22:50 to 23:15
(Outputs in Step S104)
    19:50 to 20:15, 22:50 to 23:15
(Outputs in Step S105)
    none FIG. 12 is a flowchart showing a communication control process executed by a wireless base station.

The process represented by this flowchart is executed by the intra-base station communication controlling unit 22 shown in FIG. 2.

This process is triggered by the reception of a request (connection request) to make a connection in an active or a dormant connection state, which is issued from a wireless terminal 1 to the wireless base station 2, in (1).

Subsequent to the reception of the connection request in (1), the connection number information table for respective connection types, which is shown in FIG. 9, is obtained with the connection state managing unit 26 in (2). Additionally, the upper limit numbers of connections for respective connection states (active and dormant) in the wireless base station 2, which are shown in FIG. 5, are obtained by using the each-connection-state connection upper limit number managing unit 23 in (3). Then, the process goes to step S201.

In step S201 of FIG. 12, whether or not the following two inequalities are satisfied respectively is determined by using the information obtained in the above described (2) and (3).

the number of connections for the active state (+1)>the upper limit number of connections for the active state the number of connections for the dormant state (+1)<the upper limit number of connections for the dormant state The reason why "+1" is parenthesized in both of the inequalities is that either of the inequalities, which corresponds to the connection state indicated by the connection request received in (1), is actually incremented. If step S201 is initially executed after the connection state is changed to the dormant state in step S205, the number of connections for the dormant state is incremented.

Then, in step S202, whether or not the number of connections, which is larger than the upper limit number of connections, is the number of connections for the active state is determined.

If the number of connections, which is larger than the upper limit number of connections, is determined to be the number of connections for the active state (the inequality for the active state is satisfied) in step S202, the connection information table for respective application types shown in FIG. 8 is obtained with the connection state managing unit 26 in (4). Additionally, the priority connection source telephone number table shown in FIG. 6 is obtained with the priority connection source telephone number managing unit 24 in (5). Then, the flow goes to step S203.

In step S203, rows that satisfy all of the following conditions are extracted from the connection information table for respective application types obtained in (4).

(condition 1) a connection state is "active"
(condition 2) a communication is not being made
(condition 3) a connection source telephone number is not included in a priority connection source telephone number table Upon completion of the process in step S203, the connection priority table for respective application types shown in FIG. 7 is obtained with the each-application-type connection priority information managing unit 25 in (6). Then, the flow goes to step S204.

In step S204, a row with the lowest priority of a value (application name) specified in an "application type" item among the rows resultant from the process in step S203 is further extracted by referencing the priorities of applications in the table obtained in (6).

Then, in step S205, whether or not a plurality of rows extracted in step S204 is determined. If the process extracted one row, the value specified in the "connection state" item of this row is changed (shifted) to "dormant" (corresponding portions of the tables shown in FIGS. 8 and 9 are rewritten), and it is notified to the wireless terminal 1, the value of which is specified in the "connection source telephone number" item in the row, that the connection state has been changed to the dormant state.

If the process in step S204 extracted the plurality of rows, they are sorted with a predetermined method, and the connection state is changed to the dormant state for the first row (for example, the smallest telephone number) of the results of the sorting.

For ease of explanation, the wireless terminals 1 in (1) and (7) are assumed to be the same. Generally, however, these terminals 1 are mutually different.

Upon completion of the process in step S205, the flow goes back to the above described processes in (2) and (3). This is because the number of connections for the dormant state is incremented by 1, and whether or not the inequality for the dormant state is satisfied as a result of the process in step S205 is again determined.

If the number of connections, which is larger than the upper limit number of connections, is determined to be the number of connections for the dormant state (the inequality for the dormant state is satisfied) in step S202, the connection information table for respective application types shown in FIG. 8 is obtained with the connection state managing unit 26 in (8). Additionally, the priority connection source telephone number table shown in FIG. 6 is obtained with the priority connection source telephone number managing unit 24 in (9). Then, the flow goes to step S206.

In step S206, rows that satisfy all of the following conditions are extracted from the connection information table for respective application types, which is obtained in (8).

(condition 1) a connection state is "dormant"
(condition 2) a communication is not being made
(condition 3) a connection source telephone number is not included in the priority connection source telephone number table.

Upon completion of the process in step S206, the connection priority table for respective application types shown in FIG. 7 is obtained with the each-application-type connection priority information managing unit 25 in (10). Then, the flow goes to step S207.

In step S207, a row with the lowest priority of a value (application name) specified in the "application type" item among the rows resultant from the process in step S206 is further extracted by referencing the priorities of the applications in the table obtained in (10).

Then, in step S208, whether or not a plurality of rows extracted as the results of the process in step S207 results in is determined. If the process results in one row, the value specified in the "connection state" item in that row is changed (shifted) to "null" (corresponding portions in the tables shown in FIGS. 8 and 9 are rewritten), and it is notified to the wireless terminal 1 (in (11)), the value of which is specified in the "connection source telephone number" item of the row, that the connection state has been changed to "null".

If a plurality of rows are extracted as the results of the process in step S207, they are sorted with a predetermined method, and the connection state is changed to "null" for the first row (for example, the smallest telephone number) of the results of the sorting.

For ease of explanation, the wireless terminals 1 in (1) and (11) are assumed to be the same. Generally, however, they are mutually different.

Upon completion of the process in step S208, the series of processes has been terminated.

In the above description, steps S203 and S204 are executed to extract rows, the connection state of which is changed to "dormant", from the connection information table for respective application types. However, the extraction method is not limited to this one. For example, rows may be extracted only under (condition 1) and (condition 2) in step S203, and step S207 may not be executed. This is also similar in the case where the connection state is changed to "null".

For reference, data output in steps S203 and S204 of FIG. 12 when the data shown in FIG. 3 is processed under the following preconditions are listed below.

(Preconditions)

Assume that a connection request is issued from one wireless terminal 1 to a wireless base station 2 under the following conditions.

application type: mail
connection source telephone number: 080-1111-0024
connection state: active (Data that Satisfies (Condition 1) and (Condition 2) in Step S203)
    telephone: (none)
    mail: (none)
    navigation: 080-1111-0004
    group call (push talk): 080-1111-0007
    game: 080-1111-0017
(Data that Satisfies (Condition 1), (Condition 2), and (Condition 3) in Step S203)
    telephone: (none)
    mail: (none)
    navigation: 080-1111-0004
    group call: 080-1111-0007
    game: (none)
(Output in Step S204)
    navigation: 080-1111-0004

Figure 13:
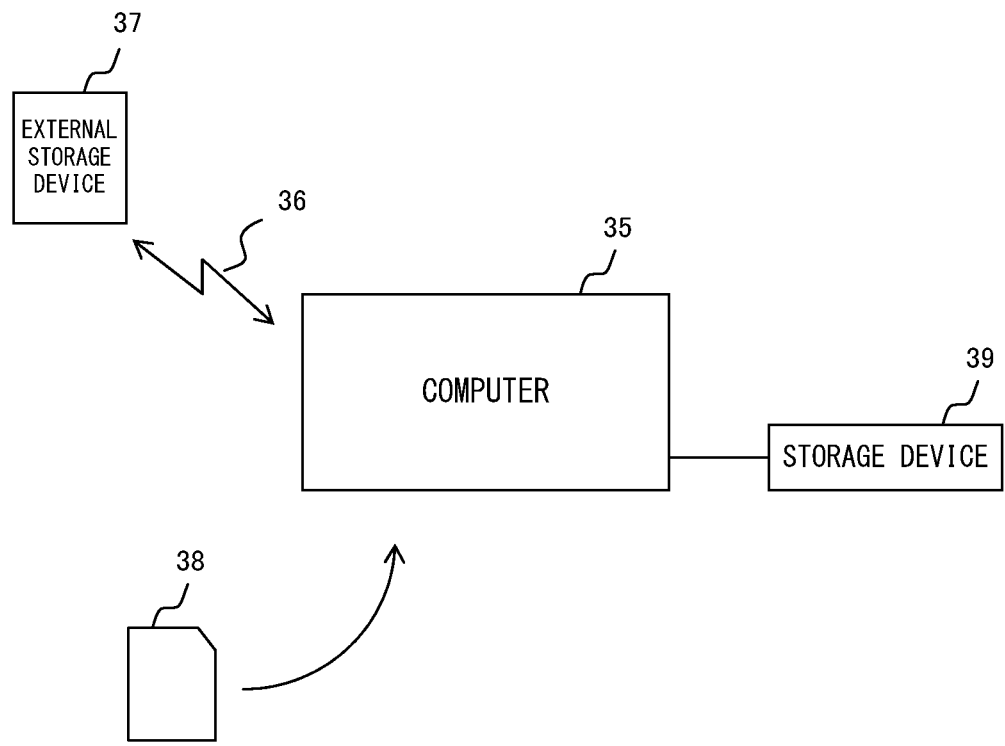
FIG. 13 is a schematic diagram showing examples of storage media.

FIG. 13 shows examples of storage media.

A program and data, which are intended to apply the present invention, may be loaded from a storage device 39 of a computer 35, from a portable storage medium 38, or from an external storage device 37 via a network 36 into a memory of the computer 35, and the program may be executed. The computer 35 is used as any of the wireless terminal 1, the wireless base station 2, and the base station controlling apparatus 3, or can be included in any of them.

What is claimed is:

1. A communication controlling method for controlling a communication using a wireless line between a wireless terminal and a wireless base station, the communication controlling method comprising:
   estimating, using a communication history of the wireless terminal for a predetermined past period, a time period with a high frequency of making communications; and
   changing a connection state between the wireless terminal and the wireless base station to a connection state in which a wireless line is occupied for the wireless terminal to allow starting of a communication using the occupied wireless line in the time period with a high frequency of making a communication, wherein
   the connection state includes an active state in which the wireless line is occupied for the wireless terminal to allow starting of a communication using the occupied wireless line, a dormant state in which the occupied wireless line is released and a logical connection between the wireless terminal and the wireless base station is maintained, and a null state in which the occupied wireless line is released and the logical connection is disconnected.

2. The communication controlling method according to claim 1, wherein:
   the time period with a high frequency is estimated using a time period provided a time margin to a time period included in the communication history; and
   the connection state between the wireless terminal and the wireless base station is changed to a connection state in which a wireless line is occupied for the wireless terminal to allow starting of a communication using the occupied wireless line when the current time enters the estimated time period.

3. The communication controlling method according to claim 1, wherein
   the connection state is changed to the active state when the current time enters the time period with a high frequency of making communications.

4. The communication controlling method according to claim 1, wherein
   the connection state is changed to the active state when the current time enters the time period with a high frequency of making communications and the current time is other than prohibition time in which a change in the connection state is prohibited.

5. The communication controlling method according to claim 1, wherein
   a wireless line is selected from among wireless lines in which the wireless terminal and the wireless base station are not in communication but which are in the active state, and a connection state of the selected wireless line is changed from the active state to the dormant state, when the number of wireless lines in the active state exceeds a predetermined number.

6. The communication controlling method according to claim 5, wherein
   the selected wireless line is a wireless line used by an application with a lowest priority among applications using the wireless line.

7. The communication controlling method according to claim 5, wherein
   the selected wireless line is a wireless line of which a telephone number is not a telephone number to be connected with high priority.

8. A communication controlling method for controlling a communication using a wireless line between a wireless terminal and a wireless base station, the communication controlling method comprising:
   estimating, using a communication history of the wireless terminal for a predetermined past period, a time period with a high frequency of making communications;
   notifying a wireless terminal of an active prohibition time in which a change to an active state, in which the wireless terminal and the wireless base station are ready to start a communication in the estimated time period, is prohibited, and of a dormant prohibition time in which a change to a dormant state, in which the wireless line is released and a logical connection between the wireless terminal and the wireless base station is maintained, is prohibited;
   changing a connection state between the wireless terminal and the wireless base station to the active state when a current time enters the estimated time period and is other than the active prohibition time;
   changing the connection state to the dormant state when the current time enters the estimated time period and the current time is the active prohibition time and is other than the dormant prohibition time; and
   changing the connection state to a null state in which the wireless line is released and the logical connection is disconnected when the current time enters the estimated time period and the current time is the active prohibition time and is the dormant prohibition time.

9. A non-transitory storage medium having stored therein a program for causing a wireless terminal to execute a process for controlling a communication using a wireless line between the wireless terminal and a wireless base station, the process comprising:
   estimating, using a communication history of the wireless terminal for a predetermined past period, a time period with a high frequency of making communications; and
   changing a connection state between the wireless terminal and the wireless base station to a connection state in which a wireless line is occupied for the wireless terminal to allow starting of a communication using the occupied wireless line in the estimated time period, wherein the connection state includes an active state in which the wireless line is occupied for the wireless terminal to allow starting of a communication using the occupied wireless line, a dormant state in which the occupied wireless line is released and a logical connection between the wireless terminal and the wireless base station is maintained, and a null state in which the occupied wireless line is released and the logical connection is disconnected.

10. A wireless terminal making a communication with a wireless base station using a wireless line, the wireless terminal comprising:

a time period estimating unit to estimate, using a communication history of the wireless terminal for a predetermined past period, a time period with a high frequency of making communications; and a communication controller to change a connection state between the wireless terminal and the wireless base station to a connection state in which a wireless line is occupied for the wireless terminal to allow starting of a communication using the occupied wireless line in the estimated time period, wherein the connection state includes an active state in which the wireless line is occupied for the wireless terminal to allow starting of a communication using the occupied wireless line, a dormant state in which the occupied wireless line is released and a logical connection between the wireless terminal and the wireless base station is maintained, and a null state in which the occupied wireless line is released and the logical connection is disconnected.

* * * * *